UNITED STATES PATENT OFFICE 2,422,156

VULCANIZATION OF RUBBERLIKE BUTADIENE-1,3 POLYMERIZATES WITH PHENOL SULFIDES

George M. Wolf, Wyandotte, and Thomas E. Deger, Grosse Ile, Mich., assignors to Sharples Chemicals Inc., Philadelphia, Pa., a corporation of Delaware No Drawing. Application October 15, 1943, Serial No. 506,410

7 Claims. (Cl. 260—79)

The present invention pertains to treatment of butadiene polymerizates, including polymerizates of various butadiene derivatives, such as chloroprene and isoprene, and co-polymers of 1,3 butadiene with styrene, acrylonitrile, or other co-polymerizable compounds containing olefinic double bonds, in the manufacture of synthetic rubber products. It is especially useful in treatment of co-polymerizates of butadiene 1,3 with styrene or acrylonitrile. The invention involves novel details affording improvements both in the mixing operation by which the polymerizate is mixed with other constituents to be included in the ultimate product, and in the subsequent vulcanizing step, and the practice of these details results in surprising improvement of the product. One of the principal shortcomings of synthetic elastomers of the butadiene type is their lack of tackiness as compared with stocks prepared from natural rubber latex. An important feature of the invention consists in the fact that it provides a process and product avoiding this defect. The quality of tackiness obtained by practice of the present invention is particularly useful in cases in which the elastomer is to be manufactured into a finished product such as a pneumatic tire, as this tackiness provides the factor necessary to insure cohesiveness of the elastomer and/or its adhesion to other constituents which may be used in the finished product. It also renders the elastomer useful as an adhesive, as for example in adhesive tapes, without vulcanization.

A second feature of the invention relates to vulcanization of the butadiene polymerizate with the material added to impart tack and with such other materials as are desired for incorporation in the ultimate product. It is believed that the applicants are the first to recognize the fact that phenol sulfides are valuable as primary vulcanizing agents in the treatment of synthetic elastomers, and important aspects of the invention rest upon applications of this discovery.

The invention involves certain specific uses of phenol sulfides in manufacture of synthetic rubber products from butadiene 1,3 polymerizates. The phenol sulfides which are preferred for practice of the invention are the tertiary alkyl phenol sulfides in which two or more benzene rings are substituted by hydroxyl radicals and tertiary alkyl radicals and connected by 1,2 or more sulfur atoms. As an illustration of the nature of these products, it may be pointed out that they may be obtained by reacting sulfur monochloride with a tertiary alkyl phenol as indicated in the following equation:

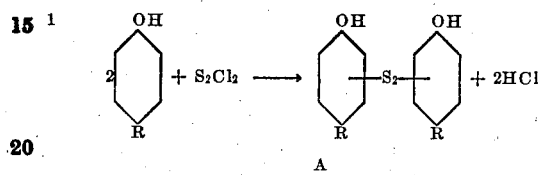

The resultant A of Equation 1 may in turn react with a further quantity of a tertiary alkyl phenol and with a further quantity of sulfur monochloride to form an analogous product having a longer chain of benzene rings connected by sulfur atoms as illustrated in the following equation:

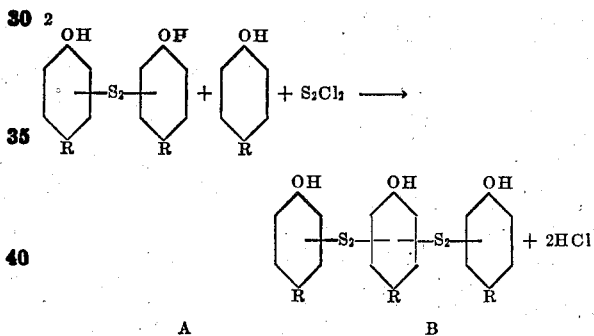

It will be seen that resultant B of Equation 2 may be further reacted with a tertiary alkyl phenol, with resultant A of Equation 1, or with a quantity of itself, and with sulfur monochloride to form more highly condensed products. It is also possible, by treatment with an oxidizing agent or by treatment with sulfur in the presence of a base, to effect further oxidation (sulfurization) of resultants A or B of Equations 1 or 2 or to oxidize in a similar manner the more advanced products of condensation obtained by further treatment of these resultants with tertiary alkyl phenols and sulfur monochloride or other compounds as discussed above, and thus to produce phenol sulfides in which the respective benzene rings are interconnected by three or more sulfur atoms.

Resultants A and B of Equations 1 and 2, more highly sulfurized products obtained by further oxidation of these resultants, and products obtained by further condensation of these resultants with tertiary alkyl phenols and sulfur monochloride will be referred to hereinafter as tertiary alkyl phenol sulfides. These compounds may be more specifically designated as tertiary alkyl phenol poly-sulfides, in cases in which the respective benzene rings are each connected by two or more sulfur atoms, or as tertiary alkyl phenol disulfides in cases in which the respective rings are each connected by two sulfur atoms.

In a manner similar to the condensation of tertiary alkyl phenols with sulfur monochloride discussed above, these tertiary alkyl phenols may be condensed with sulfur dichloride ($SCl_2$) to produce compounds analogous to resultants A and B of Equation 2 and products of higher degrees of condensation, as discussed above, but having only a single sulfur atom between the respective benzene rings. These products may be oxidized in a manner similar to that discussed above with respect to the disulfide resultants to produce more highly sulfurized products, including products of the same type discussed in connection with Equations 1 and 2.

Products of condensation of sulfur dichloride with tertiary alkyl phenols will hereinafter be referred to as tertiary alkyl phenol mono-sulfides, but these compounds will also be included within the generic term "tertiary alkyl phenol sulfides" as applied to compounds of the type of resultants A and B of Equations 1 and 2.

From consideration of Equations 1 and 2 and of the discussion above of the possibility of forming tertiary alkyl phenol disulfides having as few as two benzene rings or having many benzene rings, it will be seen that, in the manufacture of tertiary alkyl phenol disulfides by reaction of sulfur monochloride with tertiary alkyl phenols, a mixture of disulfides such as those indicated by letters "A" and "B," and analogous compounds having longer chains of benzene rings will be produced. The proportions of the phenol disulfides having only two benzene rings to phenol disulfides having longer benzene ring chain structures will, of course, depend upon the ratio of sulfur monochloride to tertiary alkyl phenol in the reaction mixture. Thus, in cases in which approximately two molecules of tertiary alkyl phenol are present in the reaction mixture for each molecule of sulfur monochloride, as indicated by Equation 1, a considerable quantity of di-tertiary alkyl phenol disulfide will be formed, although considerable quantities of analogous compounds containing three or more benzene rings will be formed even with this ratio of reactants. As the ratio of sulfur monochloride to tertiary alkyl phenol is increased, there will be an increased tendency to form compounds having three or more benzene rings interconnected by sulfur atoms. It is thus necessary to specify in some manner the sulfur content of a particular tertiary alkyl phenol disulfide reaction product in order to indicate the approximate average number of benzene rings in the reaction product mixture. The same general comment is applicable to tertiary alkyl phenol monosulfides and to tertiary alkyl phenol polysulfides of higher degrees of sulfurization than the disulfides, and to corresponding simple phenol sulfides or phenol sulfides substituted by atoms or radicals other than alkyl radicals.

While tertiary alkyl phenol sulfides of the various types discussed above, and mixtures of said types, form the preferred chemical agents for use in practice of the invention, analogous phenol sulfides containing alkyl radicals other than tertiary alkyl radicals, such as methyl, ethyl, propyl, isopropyl and higher primary and secondary alkyl radicals may be used in the practice of the invention. These compounds may be designated as alkyl phenol sulfides, and more specifically as alkyl phenol polysulfides, alkyl phenol disulfides and alkyl phenol monosulfides, by analogy to nomenclature discussed above with respect to the corresponding tertiary alkyl derivatives.

Similarly, products obtained by condensation of unsubstituted phenol, halogen substituted phenol and phenol having other substitutes, with sulfur dichloride or sulfur monochloride, and products obtained by further oxidation of these primary condensation products, may be used in the practive of the invention and will be included within the generic designation of phenol sulfides.

Phenol sulfides, including the simple mono- and di-sulfides and the higher sulfides of phenol, and similar derivatives of alkylated phenols, have heretofore been proposed for use in the manufacture of synthetic rubber products from butadiene, 1,3 polymerizates. Suggestions for use of such compounds have, however, involved use of only small proportions of these phenol sulfides, and the peculiar advantages attained by practice of the present invention cannot be attained by practice of these prior art processes.

In the patent to Hagen, 2,175,082, for example, the patentee suggests use of 3% of various phenol sulfides, including di- (tertiary amyl phenol) -disulfide, as additives for incorporation with butadiene polymerizates and other constituents mixed therewith prior to vulcanization. The patentee points out that the addition of these compounds in the proportions suggested improves the color stability of the resulting products in the presence of light.

When phenol sulfides, such as simple unsubstituted phenol mono-, di- and higher-sulfides and the various alkyl derivatives of these compounds, are incorporated by mixing these phenol sulfides with butadiene polymerizates, and the normal amount of sulfur is additionally included for vulcanization, as taught in the Hagen patent, it has been found that the aging properties of the resulting vulcanized products are frequently unsatisfactory if the amount of the phenol sulfide is substantially in excess of the 3% suggested by Hagen. Such products become brittle as the result of repeated heating incident to use, and their tensile strength and capacity for elongation prior to breakage are also impaired by aging. Thus, in the practice of his invention as taught by Hagen, involving use of the normal amount of sulfur as a vulcanizing agent, in addition to the phenol sulfide added in the practice of his invention, it is important that the quantity of the phenol sulfide be maintained relatively low as suggested by Hagen in order that these types of impairment upon aging be avoided.

The present invention rests upon the discovery that, by use of quantities of phenol sulfides substantially higher than those suggested in the Hagen patent, properties may be attained which are unattainable in use of the small proportions of the phenol sulfides taught by Hagen. Thus, by adding to the butadiene polymerizate a quantity of a phenol sulfide in excess of 5% of the weight of polymerizate under treatment, a product is obtained having the tackiness desired for cohesion of the rubber product and adhesion thereof to other materials, as mentioned above. By including this higher proportion of the phenol sulfide, considerable advantages are also attained in other regards. Thus, by such addition, the mixing of the polymerizate with other constituents to be included in the vulcanized product on the conventional mill rolls or other mixing apparatus is greatly facilitated.

A very important feature of the invention is based upon the discovery made by the present applicants that the phenol sulfide added to attain the above-discussed desirable results acts as a primary vulcanizing agent. The sulfur contained in the phenol sulfide apparently enters into the vulcanization reaction, and in cases in which large quantities of sulfur are made available for use in vulcanization through the phenol sulfide, in addition to the quantities of sulfur normally used in the vulcanization, the vulcanized product is frequently over-vulcanized, as indicated by embrittlement of this product, loss of tear resistance, and loss of elongation. When, however, it is recognized that the phenol sulfide serves as a primary vulcanizing agent, and the quantity of sulfur separately incorporated in the mixture to be vulcanized is correspondingly reduced or eliminated to take account of the sulfur available from the phenol sulfide, it is found that these factors of tear resistance upon aging, elongation at break and heat embrittlement are actually improved by inclusion of the phenol sulfide as compared to products obtained by vulcanizing operations in which the phenol sulfide is omitted.

As noted above, the preferred materials for use in practice of the invention in the proportions discussed above are the tertiary alkyl phenol mono-, di- and higher-sulfides, and we prefer to use the tertiary alkyl phenol sulfides having between 4 and 10 carbon atoms in their alkyl radicals, such compounds having between 4 and 8 carbon atoms in their alkyl radicals being especially preferred. The disulfides and higher sulfides are preferred to the monosulfides, particularly from the standpoint of vulcanization, since they provide a larger quantity of sulfur available for performance of the vulcanizing function.

While the tertiary alkyl phenol sulfides having between 4 and 10 carbon atoms in their alkyl radicals are preferred for practice of the invention, secondary alkyl phenol sulfides, such as isopropyl phenol sulfides, secondary butyl phenol sulfides, secondary amyl phenol sulfides and other secondary alkyl phenol sulfides containing between 3 and 10 carbon atoms in the alkyl radicals may be satisfactorily employed. Similarly, primary alkyl phenol sulfides containing from 1 to 10 carbon atoms in the alkyl radicals may be used, as may simple unsubstituted phenol sulfides, and phenol sulfides containing halogen or other substituents.

The following examples illustrate the practice of the invention:

Example I

A mixture was compounded on rubber mill rolls in the usual fashion, containing the following constituents (parts by weight):

| | Parts |
|---|---|
| Butadiene-1,3-styrene co-polymer | 100.0 |
| Carbon black; channel type | 40.0 |
| Zinc oxide | 5.0 |
| 2-mercaptobenzothiazole | 1.5 |
| Diphenyl guanidine | 0.1 |

1.75 parts of sulfur were incorporated with the above constituents on the mill rolls, and the resulting mixture was vulcanized for 60 minutes at 287° F. in a pressure mold. The mixture obtained from the milling operation prior to vulcanization was almost devoid of tackiness, and the vulcanized product had the following physical characteristics before and after aging:

| Before Aging | | | | After aging 72 hrs. at 100° C. in an Air Oven | | | |
|---|---|---|---|---|---|---|---|
| Modulus at 300% Elongation | Tensile Strength | Elongation | Hardness | Modulus at 300% Elongation | Tensile Strength | Elongation | Hardness |
| Lb./in.² | Lb./in.² | Per cent | Degree Shore | Lb./in.² | Lb./in.² | Per cent | Degree Shore |
| 700 | 2,580 | 610 | 56 | 2,060 | 2,110 | 310 | 65 |

As pointed out above, in the preferred practice of the invention, the phenol sulfide is mixed with the polymerizate in a ratio of at least 5 parts of the phenol sulfide per 100 parts of the polymerizate. It is desirable, in most cases, that the amount of sulfur present in the combined form of phenol sulfide to be used in vulcanization in practice of the invention constitute at least 30% of the sulfur present in the vulcanization reaction mixture.

Example II

A mixture identical with that of Example I was compounded in similar fashion, except that, in addition to the 1.75 parts of sulfur, 5 parts of para-tertiary amyl phenol disulfide of 22.8% sulfur content were incorporated, and the resulting mixture was vulcanized as in Example I. The mixture obtained from the milling operation was satisfactory from the standpoint of tackiness, and the vulcanized product had the following physical characteristics before and after aging:

| Before Aging | | | | After aging 72 hrs. at 100° C. in an Air Oven | | | |
|---|---|---|---|---|---|---|---|
| Modulus at 300% Elongation | Tensile Strength | Elongation | Hardness | Modulus at 300% Elongation | Tensile Strength | Elongation | Hardness |
| Lb./in.² | Lb./in.² | Per cent | Degree Shore | Lb./in.² 180% Broke at 180% | Lb./in.² | Per cent | Degree Shore |
| 1,800 | 2,680 | 380 | 68 | | 1,940 | 180 | 75 |

By comparison of the results obtained from Examples I and II, respectively, it will be seen that the modulus and tensile strength before aging was improved by inclusion of the tertiary amyl phenol sulfide, the elongation decreased, and the hardness increased. After aging, however, the product was less satisfactory with respect to modulus, tensile strength, elongation and hardness than the product of Example I. While Example II illustrates the advantage in tackiness obtained by inclusion of phenol sulfide, it also illustrates the disadvantages due to over-vulcanization in using a normal amount of sulfur for vulcanization in addition to a substantial amount of sulfur present in the phenol sulfide.

Example III

A mixture identical with that of Example I was compounded in similar fashion, except that, instead of using 1.75 parts of sulfur, 0.62 part of sulfur were used, and 5 parts of para-tertiary amyl phenol dislfiude of 22.8% sulfur content were incorporated, and the resulting mixture was vulcanized as in Example I. It will be noted that, in this example, which represents practice of the present invention according to the preferred form, the amount of sulfur present in the added phenol disulfide was 1.14% based on the polymerizate, whereas the amount of sulfur independently added was .62%. Thus, the sulfur present in the form of the phenol sulfide was considerably in excess of sulfur present as such. The mixture obtained from the milling operation in this case was satisfactory from the standpoint of tackiness, and the vulcanized product had the following physical characteristics before and after aging:

| Before Aging | | | | After aging 72 hrs. at 100° C. in an Air Oven | | | |
|---|---|---|---|---|---|---|---|
| Modulus at 300% Elongation | Tensile Strength | Elongation | Hardness | Modulus at 300% Elongation | Tensile Strength | Elongation | Hardness |
| Lb./in.² | Lb./in.² | Per cent | Degree Shore | Lb./in.² | Lb./in.² | Per cent | Degree Shore |
| 1,330 | 3,580 | 580 | 67 | 2,250 | 2,520 | 300 | 69 |

By comparison of the results obtained in this example with results obtained in Examples I and II, respectively, it will be seen that the properties of the product after aging were superior to those of the products of Examples I and II.

Example IV

A mixture identical with that of Example I was compounded in similar fashion, except that 5 parts of para-tertiary amyl phenol disulfide of 22.8% sulfur content constituted the only sulfur-containing constituent added to the vulcanization mixture. The invention of the present application was thus practiced in this example by the entire elimination of sulfur other than that present in the form of the mercaptobenzothiazole and the phenol disulfide. The mixture obtained from the milling operation was satisfactory from the standpoint of tackiness, and the vulcanized product had the following physical characteristics before and after aging:

| Before Aging | | | | After aging 72 hrs. at 100° C. in an Air Oven | | | |
|---|---|---|---|---|---|---|---|
| Modulus at 300% Elongation | Tensile Strength | Elongation | Hardness | Modulus at 300% Elongation | Tensile Strength | Elongation | Hardness |
| Lb./in.² | Lb./in.² | Per cent | Degree Shore | Lb./in.² | Lb./in.² | Per cent | Degree Shore |
| 800 | 2,780 | 660 | 61 | 1,580 | 3,220 | 510 | 64 |

It will be seen from the above tabulation that the product of this example was superior to that of Examples I and II, and that this superiority was most marked in connection with the product after the aging operation.

Example V

In the following runs, a mixture was in each case compounded on rubber mill rolls in the usual fashion, containing the following constituents (parts by weight):

| | Parts |
|---|---|
| Butadiene 1,3-styrene co-polymer | 100.0 |
| Coal tar softener | 4.5 |
| Stearic acid | 1.0 |
| Zinc oxide | 3.0 |
| Carbon black, channel type | 43.0 |
| 2-Mercaptobenzothiazole | 1.6 |
| Diphenyl guanidine | 0.1 |

In each run, one or more vulcanizing agents, consisting of a para-tertiary amyl phenol mono-sulfide, sulfur or both, were also mixed with these constituents on the mill rolls, and the resulting mixture was in each case vulcanized for 60 minutes at 280° F. in a pressure mold. In run #1, the vulcanizing agent consisted of 17.9 parts of para-tertiaryamylphenol mono-sulfide of 8.95% sulfur content and 1.6 parts of sulfur. In run #2, the vulcanizing agent consisted of 12.5 parts of para-tertiaryamylphenol mono-sulfide of 12.8% sulfur content and 1.6 parts of sulfur. In run #3, the vulcanizing agent was 9.75 parts of para-tertiaryamylphenol mono-sulfide of 16.5% sulfur content without any separately added sulfur. In run #4, the vulcanizing agent was 1.6 parts of sulfur, without any separately added phenol sulfide vulcanizing agent. In runs 1 to 3, the product possessed adequate tack, while in run #4, it was almost entirely devoid of tackiness. The other properties of the products of runs 1 to 4 are listed below.

| Run No. | Modulus at 300% Elongation | Tensile Strength | Elongation | Hardness | Tear Resistance (A. S. T. M. die B) |
|---|---|---|---|---|---|
| | Lb./in.² | Lb./in.² | Per cent | Degree Shore | Lb./in. |
| BEFORE AGING ||||||
| 1 | 530 | 2,700 | 725 | 55 | 238 |
| 2 | 780 | 2,610 | 670 | 63 | 321 |
| 3 | 700 | 2,300 | 710 | 63 | 276 |
| 4 | 700 | 2,810 | 650 | 55 | 252 |
| AFTER AGING 72 HRS. AT 100° C. IN AN AIR OVEN ||||||
| 1 | 1,170 | 2,350 | 480 | 66 | |
| 2 | 1,660 | 2,420 | 390 | 74 | |
| 3 | 1,150 | 2,880 | 630 | 69 | |
| 4 | Broke at 240% | 1,910 | 240 | 69 | |

By consideration of the results tabulated above, it will be seen that the products had satisfactory age resisting properties in every case except in the 4th run, in which no phenol sulfide was added.

Example VI

In the following runs, a mixture was in each case compounded on rubber mill rolls in the usual fashion, containing the same constituents as tabulated in Example V.

In each run, one or more vulcanizing agents, consisting of a para-tertiaryamylphenol di-sulfide, sulfur or both, were also mixed with these constituents on the mill rolls, and the resulting mixture was in each case vulcanized as in Example V. In run #1, the vulcanizing agent consisted of 7.0 parts of para-tertiaryamylphenol di-sulfide of 22.8% sulfur content, no sulfur being added as such. In run #2, the vulcanizing agent consisted of 5.6 parts of para-tertiaryamylphenol di-sulfide of 28.0% sulfur content, without additional sulfur. In run #3, the vulcanizing agent consisted of 5.6 parts of para-tertiaryamylphenol di-sulfide of 28.0% sulfur content and 1.6 parts of sulfur. In run #4, the vulcanizing agent was 1.6 parts of sulfur, without any separately added phenol sulfide vulcanizing agent. In runs 1 to 3, the product possessed adequate tack, while in run 4 it was almost entirely devoid of tackiness. The other properties of the products of runs 1 to 4 are listed below.

| Run No. | Modulus at 300% Elongation | Tensile Strength | Elongation | Hardness | Tear Resistance (A. S. T. M. die B) |
|---|---|---|---|---|---|
| | Lb./in.² | Lb./in.² | Per cent | Degree Shore | Lb./in. |
| BEFORE AGING ||||||
| 1 | 840 | 2,680 | 700 | 60 | 331 |
| 2 | 1,120 | 3,000 | 600 | 62 | 381 |
| 3 | 2,000 | 2,550 | 330 | 69 | 210 |
| 4 | 700 | 2,810 | 650 | 55 | 252 |
| AFTER AGING 72 HRS. AT 100° C. IN AN AIR OVEN ||||||
| 1 | 1,570 | 3,090 | 520 | 69 | |
| 2 | 2,120 | 2,120 | 300 | 73 | |
| 3 | Broke at 130% | 1,790 | 130 | 83 | |
| 4 | Broke at 240% | 1,910 | 240 | 69 | |

It will be seen by the results tabulated above that the product of run 3 was distinctly over-vulcanized, and that the products of runs 3 and 4 were much less satisfactory after aging than the products of runs 1 and 2, in which the para-tertiary amyl phenol disulfide was present as a vulcanizing agent, tack imparting agent and stabilizer and in which over-vulcanization was avoided.

Example VII

A mixture was compounded on rubber mill rolls containing the following constituents:

| | Parts |
|---|---|
| Butadiene 1,3-acrylonitrile co-polymer | 100.0 |
| Zinc oxide | 5.0 |
| Stearic acid | 0.5 |
| Carbon black, channel type | 50.0 |
| Tetra-ethyl thiuram disulfide | 0.4 |
| Para-tertiary amyl phenol disulfide of 28.3% sulfur content | 5.6 |

The above stock was cured for 45 minutes at 310° F. in a pressure mold, and the vulcanized product had the following properties:

| Modulus at 300% Elongation | Tensile Strength | Elongation | Hardness | Tear Resistance A. S. T. M. (die B) |
|---|---|---|---|---|
| BEFORE AGING |||||
| Lb./in.² | Lb./in.² | Per cent | Degrees Shore | Lb./in. |
| 2,090 | 4,300 | 520 | 75 | 283 |
| AFTER AGING 72 HRS. AT 100° C. IN AN AIR OVEN |||||
| 3,800 | 3,800 | 300 | 78 | |

The 5.6 parts of para-tertiary amyl phenol disulfide of 28.3% sulfur content in the above stock was replaced with 1.6 parts elemental sulfur. The vulcanized stock had the following physical characteristics:

| Modulus at 300% Elongation | Tensile Strength | Elongation | Hardness | Tear Resistance A. S. T. M. (die B) |
|---|---|---|---|---|
| BEFORE AGING |||||
| Lb./in.² | Lb./in.² | Per cent | Degrees Shore | Lb./in. |
| Broke at 230% | 2,800 | 230 | 80 | 172 |
| AFTER AGING 72 HRS. AT 100° C. IN AN AIR OVEN |||||
| Broke at 160% | 2,680 | 160 | 81 | |

Example VIII

A mixture was compounded on rubber mill rolls containing the following constituents:

| | Parts |
|---|---|
| Pale crepe | 50.0 |
| Butadiene 1,3-styrene co-polymer | 50.0 |
| Zinc oxide | 5.0 |
| Stearic acid | 1.0 |
| Carbon black, channel type | 50.0 |
| 2-mercaptobenzothiazole | 1.2 |
| Para-tertiary amyl phenol disulfide of 22.8% sulfur content | 10.0 |

The stock was cured for 90 minutes at 280° F. in a pressure mold and the vulcanized product had the following properties:

| Modulus at 300% Elongation | Tensile Strength | Elongation | Hardness | Tear Resistance A. S. T. M. (die B) |
|---|---|---|---|---|
| BEFORE AGING | | | | |
| Lb./in.² 1,080 | Lb./in.² 3,510 | Per cent 660 | Degrees Shore 65 | Lb./in. 504 |
| AFTER AGING 72 HRS. AT 100° C. IN AN AIR OVEN | | | | |
| 1,970 | 2,520 | 350 | 72 | ---------- |

The 10 parts of para-tertiary amyl phenol disulfide of 22.8% sulfur content was replaced with 2.26 parts of elemental sulfur. This vulcanized stock had the following characteristics:

| Modulus at 300% Elongation | Tensile Strength | Elongation | Hardness | Tear Resistance A. S. T. M. (die B) |
|---|---|---|---|---|
| BEFORE AGING | | | | |
| Lb./in.² 1,450 | Lb./in.² 3,450 | Per cent 560 | Degrees Shore 60 | Lb./in. 520 |
| AFTER AGING 72 HRS. AT 100° C. IN AN AIR OVEN | | | | |
| Broke at 230% | 2,100 | 230 | 72 | ---------- |

Example IX

A mixture was compounded on rubber mill rolls containing the following constituents:

|   | Parts |
|---|---|
| Butadiene 1,3-styrene co-polymer | 100.0 |
| Coal tar softener | 4.5 |
| Stearic acid | 1.0 |
| Zinc oxide | 3.0 |
| Carbon black, channel type | 43.0 |
| 2-mercaptobenzothiazole | 1.6 |
| Diphenyl guanidine | 0.1 |
| Para-tertiary butyl phenol disulfide of 24.4% sulfur content | 6.6 |

The above stock was cured for 60 minutes at 280° F. in a pressure mold, and the vulcanizate had the following properties:

| Modulus at 300% Elongation | Tensile Strength | Elongation | Hardness | Tear Resistance A. S. T. M. (die B) |
|---|---|---|---|---|
| BEFORE AGING | | | | |
| Lb./in.² 970 | Lb./in.² 2,720 | Per cent 670 | Degrees Shore 63 | Lb./in. 343 |
| AFTER AGING 72 HRS. AT 100° C. IN AN AIR OVEN | | | | |
| 1,800 | 2,400 | 380 | 71 | ---------- |

The 6.6 parts of para-tertiary butyl phenol disulfide of 24.4% sulfur content in the above stock was replaced with 1.6 parts elemental sulfur. The vulcanized stock had the following physical characteristics:

| Modulus at 300% Elongation | Tensile Strength | Elongation | Hardness | Tear Resistance A. S. T. M. (die B) |
|---|---|---|---|---|
| BEFORE AGING | | | | |
| Lb./in.² 700 | Lb./in.² 2,810 | Per cent 650 | Degrees Shore 55 | Lb./in. 252 |
| AFTER AGING 72 HRS. AT 100° C. IN AN AIR OVEN | | | | |
| Broke at 240% | 1,910 | 240 | 69 | ---------- |

The invention is also useful in manufacture of elastomers comprising mixtures of butadiene hydrocarbon polymers and natural rubber.

Various other modifications are also possible within the scope of the invention, and we do not therefore wish to be limited except by the following claims. In these claims, the term "butadiene polymerizate" is intended to include polymerizates and co-polymerizates of various butadiene derivatives as indicated by the opening paragraph of this specification.

We claim:

1. In the manufacture of vulcanized synthetic rubber products, the process which comprises mixing a synthetic rubber-like butadiene 1,3 polymerizate with a tertiary alkyl phenol sulfide consisting of at least two benzene rings interconnected by sulfur and substituted by hydroxyl and tertiary alkyl radicals in a ratio of between 5 and 25 parts of the phenol sulfide per 100 parts of the polymerizate, the sulfur of said phenol sulfide constituting at least 30% of the sulfur present in the vulcanization reaction mixture, and the sulfur of said phenol sulfide being in replacement of a corresponding amount of the sulfur normally required for the vulcanizing operation, and thereafter vulcanizing the reaction mixture.

2. In the manufacture of vulcanized synthetic rubber products, the process which comprises mixing a synthetic rubber-like butadiene 1,3 polymerizate with an alkyl phenol sulfide consisting of at least two benzene rings interconnected by sulfur and substituted by hydroxyl and alkyl radicals in a ratio of between 5 and 25 parts of the phenol sulfide per 100 parts of the polymerizate, the sulfur of said phenol sulfide constituting at least 30% of the sulfur present in the vulcanization reaction mixture, and the sulfur of said phenol sulfide being in replacement of a corresponding amount of the sulfur normally required for the vulcanizing operation, and thereafter vulcanizing the reaction mixture.

3. In the manufacture of vulcanized synthetic rubber products, the process which comprises mixing a synthetic rubber-like butadiene 1,3 polymerizate with a phenol sulfide consisting of at least two benzene rings interconnected by sulfur and substituted by hydroxyl radicals in a ratio of between 5 and 25 parts of the phenol sulfide per 100 parts of the polymerizate, the sulfur of said phenol sulfide constituting at least 30% of the sulfur present in the vulcanization reaction mixture, and the sulfur of said phenol sulfide being in replacement of a corresponding amount of the sulfur normally required for the vulcanizing operation, and thereafter vulcanizing the reaction mixture.

4. In the manufacture of vulcanized synthetic rubber products, the process which comprises mixing rubber-like co-polymerizate of butadiene 1,3 and acrylonitrile with a tertiary alkyl phenol sulfide consisting of at least two benzene rings interconnected by sulfur and substituted by hydroxyl and tertiary alkyl radicals in a ratio of between 5 and 25 parts of the phenol sulfide per 100 parts of the polymerizate, the sulfur of said phenol sulfide constituting at least 30% of the sulfur present in the vulcanization reaction mixture, and the sulfur of said phenol sulfide being in replacement of a corresponding amount of the sulfur normally required for the vulcanizing operation, and thereafter vulcanizing the reaction mixture.

5. In the manufacture of vulcanized synthetic rubber products, the process which comprises mixing a rubber-like co-polymerizate of butadiene 1,3 and styrene with a tertiary alkyl phenol sulfide consisting of at least two benzene rings interconnected by sulfur and substituted by hydroxyl and tertiary alkyl radicals in a ratio of between 5 and 25 parts of the phenol sulfide per 100 parts of the polymerizate, the sulfur of said phenol sulfide constituting at least 30% of the sulfur present in the vulcanization reaction mixture, and the sulfur of said phenol sulfide being in replacement of a corresponding amount of the sulfur normally required for the vulcanizing operation, and thereafter vulcanizing the reaction mixture.

6. In the manufacture of vulcanized synthetic rubber products, the process which comprises mixing a rubber-like co-polymerizate of butadiene 1,3 and acrylonitrile with a phenol sulfide consisting of at least two benzene rings interconnected by sulfur and substituted by hydroxyl radicals in a ratio of between 5 and 25 parts of the phenol sulfide per 100 parts of the polymerizate, the sulfur of said phenol sulfide constituting at least 30% of the sulfur present in the vulcanization reaction mixture, and the sulfur of said phenol sulfide being in replacement of a corresponding amount of the sulfur normally required for the vulcanizing operation, and thereafter vulcanizing the reaction mixture.

7. In the manufacture of vulcanized synthetic rubber products, the process which comprises mixing a rubber-like co-polymerizate of butadiene 1,3 and styrene with a phenol sulfide consisting of at least two benzene rings interconnected by sulfur and substituted by hydroxyl radicals in a ratio of between 5 and 25 parts of the phenol sulfide per 100 parts of the polymerizate, the sulfur of said phenol sulfide constituting at least 30% of the sulfur present in the vulcanization reaction mixture, and the sulfur of said phenol sulfide being in replacement of a corresponding amount of the sulfur normally required for the vulcanizing operation, and thereafter vulcanizing the reaction mixture.

GEORGE M. WOLF.
THOMAS E. DEGER.

REFERENCES CITED

The following references are of record in the file of this patent:

UNITED STATES PATENTS

| Number | Name | Date |
| --- | --- | --- |
| 1,849,489 | Howland | Mar. 15, 1942 |
| 2,175,082 | Hagen et al. | Oct. 3, 1939 |
| 2,359,122 | Kirby et al. | Sept. 26, 1944 |